United States Patent [19]

Crain

[11] Patent Number: 4,484,269
[45] Date of Patent: Nov. 20, 1984

[54] APPARATUS FOR PROVIDING MEASUREMENT OF CENTRAL PROCESSING UNIT ACTIVITY

[75] Inventor: John B. Crain, Phoenix, Ariz.

[73] Assignee: Honeywell Information Systems Inc., Phoenix, Ariz.

[21] Appl. No.: 374,842

[22] Filed: May 5, 1982

[51] Int. Cl.³ .............................................. G06F 1/00
[52] U.S. Cl. ................................................... 364/200
[58] Field of Search ... 364/200 MS File, 900 MS File

[56] References Cited

U.S. PATENT DOCUMENTS

| 4,090,239 | 5/1978 | Twibell et al. | 364/200 |
| 4,166,290 | 8/1979 | Furtman et al. | 364/200 |
| 4,183,083 | 1/1980 | Chatfield | 364/200 |
| 4,369,493 | 1/1983 | Kronenberg | 364/200 |
| 4,387,427 | 6/1983 | Cox et al. | 364/200 |

Primary Examiner—Raulfe B. Zache
Attorney, Agent, or Firm—L. D. Burton; L. J. Marhoefer

[57] ABSTRACT

Apparatus and method for measurement of the activity of a central processing unit of a data processing system resulting from the execution of a program or series of programs. A value is initially entered in an arithmetic circuit. Each time an instruction is executed, a quantity related to the amount of activity required to execute the instruction is decremented from the arithmetic circuit. When value in the arithmetic circuit reaches zero, the operating system is notified and a decision whether to continue the program or initiate some other activity in the data processing unit is made. The usage of the machine is therefore determined by the number of times the arithmetic circuit has reached zero during the execution of a program and by the quantity remaining in the arithmetic circuit when execution of the program is complete. Provision is made for other measurement modes such as decrementing the quantity in the arithmetic circuit by a clock.

17 Claims, 4 Drawing Figures

APPARATUS FOR PROVIDING MEASUREMENT OF CENTRAL PROCESSING UNIT ACTIVITY

BACKGROUND OF THE INVENTION

1. Field of the Invention

This invention relates generally to data processing systems and more particularly to apparatus for measuring activity required by a central processing unit of a data processing system for execution of a program.

2. Description of the Related Art

In the related art, it is known to measure the usage of a data processing system by measuring (at least in part) the time required by the central processing unit for the execution of a program. A numeric value can be loaded into an arithmetic circuit at the beginning of a program and the value in the arithmetic circuit decremented in response to periodic clock signals generated by the data processing system. When the arithmetic circuit reaches zero, control of the program would be returned to a supervisor program. The supervisor program would then determine whether to continue the program currently in execution or to intitiate some other activity in the data processing unit.

It has been found that measuring the activity of a central processing unit resulting from the execution of a program can vary from system to system because of the characteristics of the different data processing systems. As a result, when a multiprocessor system is being utilized as a data processing utility, this measurement can result in different customer charges for execution of the same program, the difference depending on the particular central processing unit. Furthermore, system activity can affect the availability of data processing resources with the result that a different activity period can be measured for the same program execution in the same data processing system. A need therefore existed for more accurate measurement of the activity of the central processing unit of the data processing system, obtained by measurements that were not directly based on a continuously running clock, but were based on other parameters, parameters related to the activity of the central processing unit required for execution of the program.

SUMMARY OF THE INVENTION

It is therefore an object of the present invention to provide an apparatus associated with the central processing unit of the data processing system that can measure the processing unit activity for execution of a software program.

It is a further object of the present invention to provide measurement apparatus that is activated by individual software program instructions, so that the activity of the central processing unit can be determined on the basis of the individual software instructions.

It is a further object of the present invention to provide apparatus associated with the central processing unit that, in addition to measuring the number of instructions of a software program, provides a method of weighting the impact of each instruction on the performance of the central processing unit.

The aforementioned and other aspects of the present invention are obtained by providing measurement apparatus that, at the beginning of a program or other central processing unit event, places an initial count in an arithmetic circuit. After the initial count is placed in the arithmetic circuit, each time thereafter that a program instruction is processed, the count in the arithmetic unit is decremented until a zero value is detected in the measurement apparatus. The amount by which the count in the arithmetic circuit is decremented is determined in the following manner. Each time an instruction is processed, the operation code (op-code) associated with the instruction is applied to a memory forming part of the measurement apparatus. Associated with each op-code, in a memory is a weighting factor related to the activity impact of the particular program instruction on the central processing unit. The weighting factor is extracted from the memory and is applied to an adder circuit. Also applied to the adder circuit are the least significant bits of the arithmetic circuit. The weighted central processing quantity is then decremented from the least significant bit count in the adder and the results are placed in the portion of the arithmetic circuit which stores the least significant bits. Logic is included for any "borrow" quantities affecting the non-least significant bit portion in the arithmetic circuit. When the arithmetic circuit is decremented to zero, then the control of the program is returned to the operating system for determination of future central processor activity. If, however, the program is completed prior to a zero being present in the arithmetic circuit, the quantity stored in the arithmetic circuit is transferred and is added to a quantity already stored in an appropriate file which is determined by the number of times the arithmetic circuit has already reached a zero value. The resulting quantity is stored in the file and is a measure of the central processing unit activity. In a second mode of operation the arithmetic circuit can be decremented by an oscillator so that the activity of a central processing unit in execution of a program can be determined by the time required to execute the program. These and other features of the invention will be understood upon reading of the following specification along with the drawings.

DESCRIPTION OF THE PREFERRED EMBODIMENT

Description of the Figures

Figure 1:
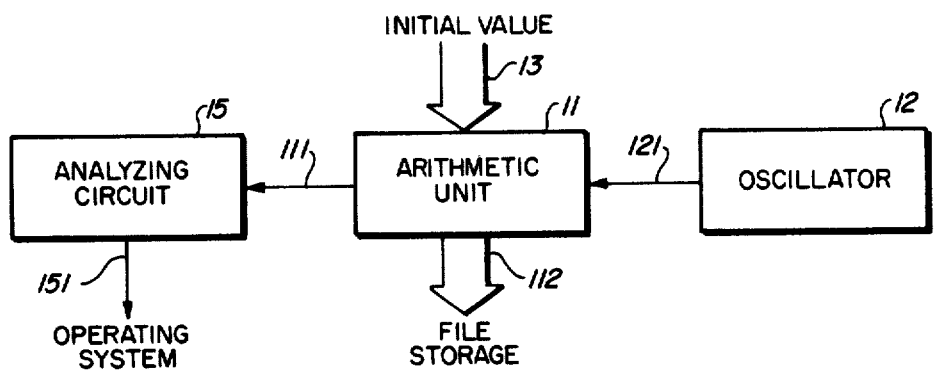
FIG. 1 is a block diagram of the previous apparatus measuring program execution activity by the central processing unit.

Referring now to FIG. 1, an arithmetic circuit 11 is coupled to an oscillator 12 and an analyzing circuit 15. The arithmetic circuit 11 is loaded with the initial value via data path 13. Thereafter, the value in the arithmetic circuit is decremented by oscillator 12, until either the arithmetic unit reaches zero value or the program under execution is complete. When the arithmetic unit 11 reaches a zero value, this value is detected by analyzing circuit 15 and, upon detection of this value, a signal is sent to the operating system via path 151. The quantity in the arithmetic unit can then be combined with other quantities (resulting from the arithmetic unit reaching zero values during the program execution) to determine the total time required for program execution.

Figure 2:
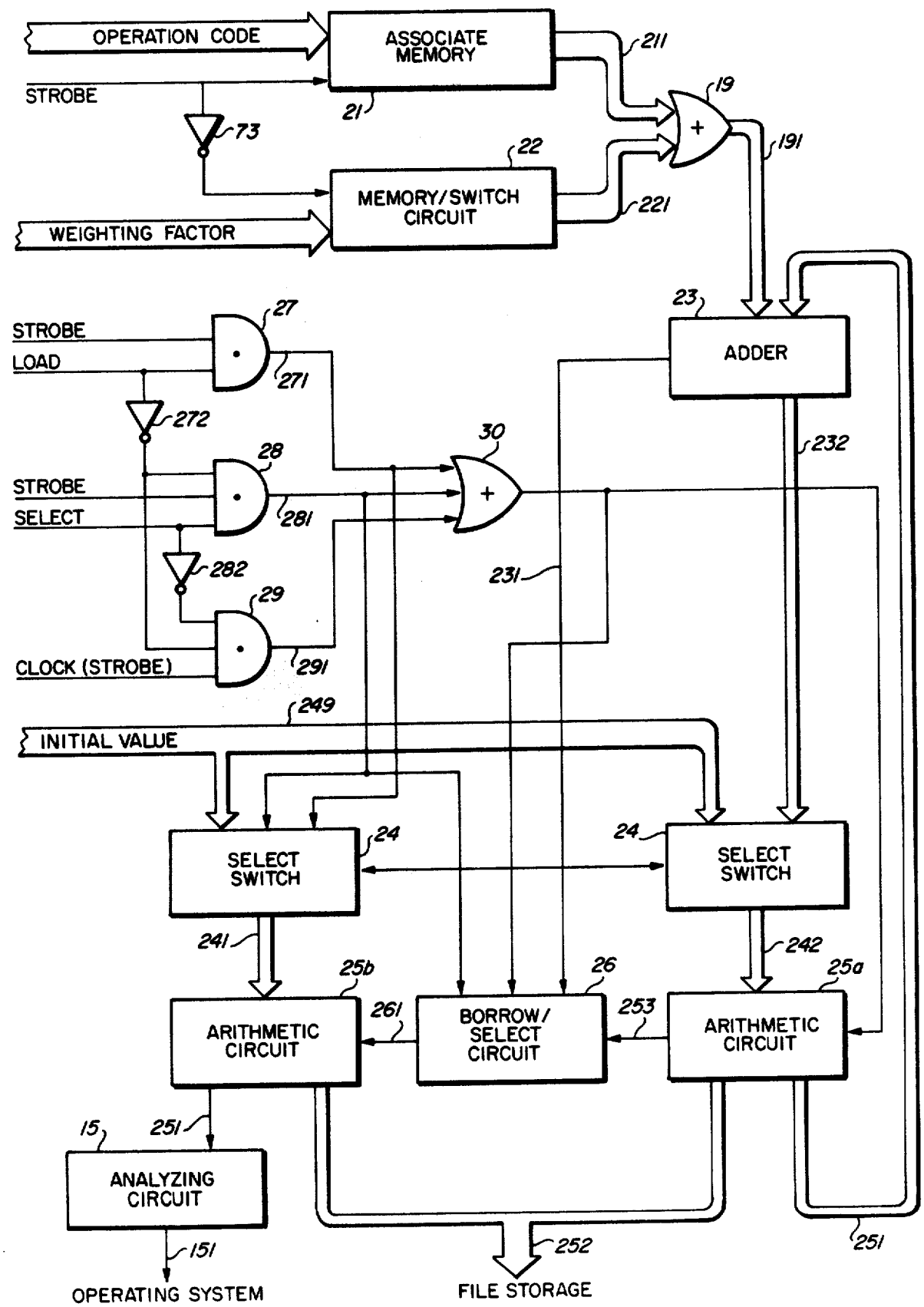
FIG. 2 is a block diagram of apparatus for measuring program execution activity according to the present invention.

Referring next to FIG. 2, an associative memory 21 receives an operation code signal and a strobe signal. The strobe signal is also applied to memory/switch circuit 22 through inverter 73. Weighting factor signals are also applied to memory/switch circuit 22. The output signals of the associative memory 21 and the output signals of memory/switch circuit 22 are applied to input terminals of logic OR gate 19 via signal paths 211 and 221 respectively. The output signal of the OR gate 19 is applied to adder 23. The output of adder 23 is applied to select switch 24 via data path 232. Select switch 24 also receives intial value signals via data path 249. Output signals of the adder 23 are also applied via signal path 231 to borrow/select circuit 26. The output signals of select switch 24 are applied via data path 241 and 242 to arithmetic circuit 25a 25b, respectively. Arithmetic circuit 25a is also coupled to borrow/select circuit 26 via data path 253. The output of borrow/select circuit 26 is applied to arithmetic circuit 25b via data path 261. Each of the arithmetic circuits 25a and 25b includes signal register means. Arithmetic circuit 25b is coupled via signal path 251 to analyzing circuit 15. The output signals of analyzing circuit 15 are coupled via signal path 151 to the operating system. The output signals of arithmetic circuit 25a and 25b are coupled via data path 252 to file storage apparatus. These signals may require processing before storage by apparatus not included as part of the invention. Output signals of the arithmetic circuit 25a are coupled to adder 23 via data path 251. Logic AND gate 27 has a load signal and a strobe signal applied to input terminals thereof. The output signal of AND gate 27 is applied to an input terminal of logic OR gate 30 and to select switch 24. The load signal is also applied to an input terminal of inverter amplifier 272. The output of inverter amplifier 272, the strobe signal and a select signal are applied to input terminals of logic AND gate 28. The output terminal of AND gate 28 is coupled to a second input terminal of OR gate 30, to select switch 24 and to borrow/select circuit 26. The select signal is also coupled to an input terminal of inverter amplifier 282. An output terminal of inverter amplifier 272, an output terminal of inverter amplifier 282 and a clock (or strobe) signal are coupled to input terminals of logic AND gate 29. This clock (or strobe) signal may be derived from a periodic, time based signal source such as an oscillator. The output terminal of logic AND gate 29 is coupled to a third input terminal of OR gate 30. The output terminal of OR gate 30 is coupled to borrow/select circuit 26 and to arithmetic circuit 25a.

Figure 3:
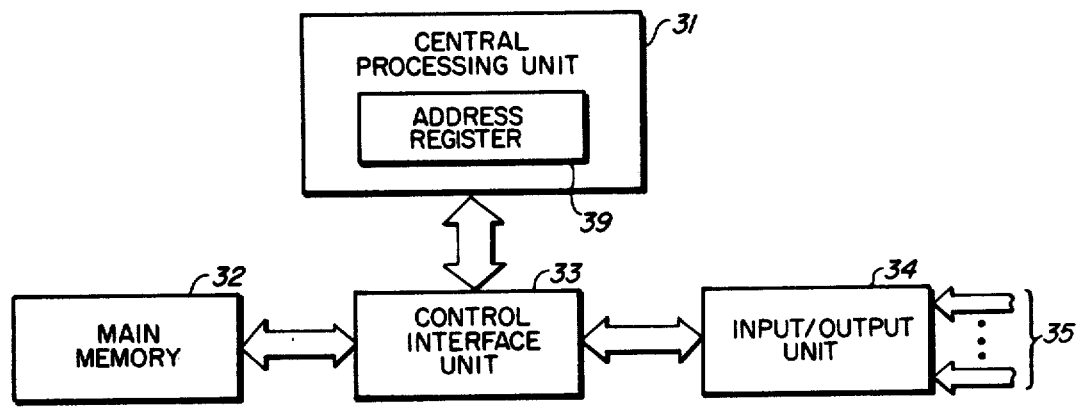
FIG. 3 is a block diagram of the general data processing system utilizing the present invention.

Referring next to FIG. 3, the general organization of a data processing system utilizing the present invention is shown. The central processing unit 31 is the portion of the data processing system where much of the manipulation of the data takes place. The request for data goes through the control interface unit 33 and data and instruction signals are extracted from main memory 32. The control interface unit also controls the transfer of data between main memory 32 and peripheral units 35 coupled to an input/output unit 34. The address register 39 is a register located in the central processing unit and contains the address of the next instruction or data for the program operation ready to be executed.

Figure 4:
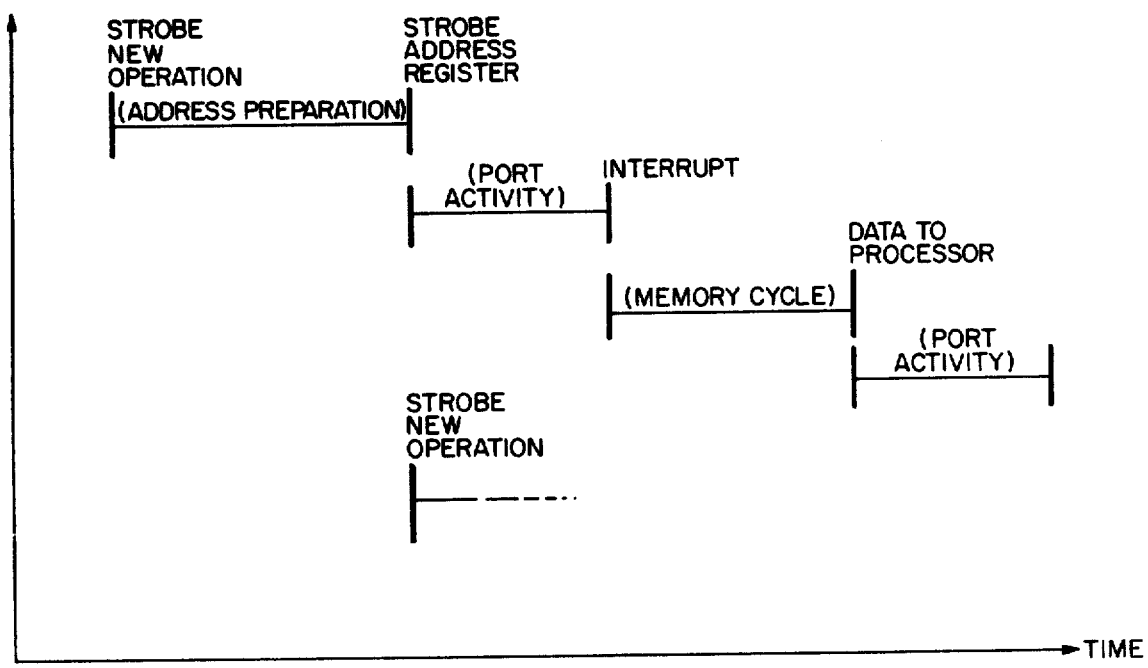
FIG. 4 is a schematic timing diagram illustrating the operation of the measurement apparatus of the present invention.

Referring now to FIG. 4, a general time sequence is shown to clarify how the invention is related to the operation of the central processor. The STROBE NEW OPERATION command causes a new operation to begin execution in the central processing unit. The central processing unit determines the address of the data needed for execution of this operation. At the end of this period, a STROBE ADDRESS REGISTER signal is produced and the address is delivered to a port of the central processing unit for delivery to the control interface unit. During the next period of time, port activity associated with the control interface unit is undertaken until an interrupt signal begins the operation of data being withdrawn from memory during the memory cycle. The data is then extracted from the identified address and sent to a port where a period of time is utilized to prepare the central processing unit for the arrival of the data. Although other signals could have been used to indicate the execution of a program operation, in the preferred embodiment STROBE ADDRESS REGISTER signal was used as the signal for counting the activity of the central processing unit and is the strobe signal of FIG. 2. Note that each operation has an associated operation code in the operation instruction. The operation code or op-code defines the central processing unit activity associated with the instruction.

Operation of the Preferred Embodiment

The operation of the preferred embodiment of the invention can be understood in that the activity of the central processing unit is specified not by the time for program execution, but by the particular set of instructions needed to implement an operation. Because activity of the data processing unit for each instruction of a program is identified in the op-code portion of the instruction, then a weighting factor of each potential instruction op-code can be used to estimate the average activity resulting from each instruction. Numerical values representative of such weighting factors are entered in the associative memory unit, having been determined either by an experience or by theoretical considerations. Upon application of an op-code to associative memory 21, the output signal is then the weighting factor.

In a first mode of operation, the register means of arithmetic circuit 25 has entered therein an initial value resulting from signals from AND gate 27 applied to select switch 24. Then activity of the central processing unit causes the contents of arithmetic circuit 25 to be decremented. In the mode of operation corresponding to prior measurement devices, the absence of a load and a select signal results in OR gate 30 applying clock pulses to arithmetic circuit 25a. Each pulse decrements the contents of arithmetic circuit 25a and the output of OR gate 30 applied to borrow/select switch circuit 26 allows the decrementing to propogate to arithmetic circuit 25b. When the value in arithmetic circuit 25a and 25b reaches zero, analyzing circuit 15 identifies this condition and a signal is sent to the operating system. The program supervisor can then continue the program execution by placing an initial value in the arithmetic circuit 25. Otherwise, the system supervisor can initiate the execution of a higher priority program set. In this mode, the activity of the central processing unit is measured by the time for execution of the program based on the periodic pulses. When the program is complete, the contents of arithmetic circuit 25 can be processed, along with stored information as to how many times in the course of program execution the arithmetic unit was decremented to zero, to obtain a total time measurement for the execution of the program.

In the second mode of operation for measurement of central processing unit activity, each instruction receives a weighting factor corresponding to a predetermined criteria for execution of the instruction by the central processing unit. The weighting factors are stored in associative memory 21. When an op-code is applied to associative memory 21 along with a strobe signal, the weighting factor corresponding to the opcode is applied to adder 23. Adder 23 also has applied thereto the least significant bits of arithmetic circuit 25 contained in arithmetic circuit 25a. The weighting factor is subtracted from the contents of arithmetic circuit 25a. When a strobe and select signal are present at input terminals of AND gate 28, select switch 24 is activated, the contents of adder stored in arithmetic circuit 25a upon application of a signal from OR gate 30 to circuit 25a. If a borrow operation is necessary to decrement the most significant bits located in arithmetic circuits 25b, this operation is performed through the borrow select circuit 26 activated by signals from AND gate 28 and OR gate 30. As before, a zero value in arithmetic circuits 25a and 25b can be identified by analyzing circuit 15 and a signal transmitted to the system supervisor. Upon completion of the program, the weighted activity value in the arithmetic circuits is processed and stored in a related file.

For further flexibility, a memory/switch unit 22 has been added. Because of signals from inverter circuit 73, either memory 21 or circuit 22 an be activated, but not both simultaneously. Circuit 22 allows a constant weighting factor to be entered externally, i.e., by switches. In addition, circuit 22 can be a memory such as memory 21, and activated under data processing conditions that requires different weighting factors to be applied resulting from the operation code of the instruction set. The number of bits of data in the weighting factor can be used to vary the granularity of the weighting factor. In the preferred embodiment 8-bits are availabale. Adder 23 and arithmetic circuit 25a utilize 8 bits of binary data to be consistent with the granularity of the preferred embodiment.

The strobe signal applied to gate 27 and gate 28 and to memory 21 are derived from the STROBE ADDRESS REGISTER signal. This signal is always issued during an instruction execution. It will be clear to those skilled in the art that other signals in the data processing system can be utilized to activate the weighted measurement.

Although the arithmetic circuit 25a and 25b are operated by decrementing some initial value, it will be clear that the same result can be obtained by incrementing the circuit with or without an initial value, changing the borrow/select circuit to a carry/select circuit and having the analyzing circuit identify a predetermined maximum value.

What is claimed is:

1. Apparatus for measuring the usage of a central processing unit resulting from execution of an instruction, said apparatus comprising:
   register means for storing a predetermined numerical value signal;
   memory means for storing a plurality of weighting factor signals correlated to a portion of each of a plurality of instruction signals;
   means responsive to signals representing said portion of an instruction being executed for extracting the correlated weighting factor signal from said memory; and
   decrementing means coupled to said memory means and said register means for decrementing said numerical value signal by an amount commensurate with said extracted correlated weighting factor signal.

2. The usage measuring apparatus of claim 1 including an oscillator means, and selectively operable means coupling said oscillator means to said decrementing means for selectively decrementing said numerical value signals periodically.

3. The usage measuring apparatus of claim 1 further including signal means for selectively decrementing said numerical value signals in said register means by constant value signals and further including a selectively actuated switch means coupling said signal means to said decrementing means, said switch means being actuated to couple said signal means to said decrementing means when said memory means is deactivated.

4. Apparatus for measuring the usage of a central processor unit resulting from an execution of a series of instructions, said apparatus comprising:
   memory means for storing a plurality of signals correlated, respectively, with individual ones of said instructions and representative of the relative activity of said central processing unit for each of said instructions;
   means responsive to signals representing a portion of each of said instructions for extracting from said memory means the one of said signals associated with the instruction being executed;
   accumulation means coupled to said memory means for accumulating said signals extracted from said memory in response to execution of each of said instructions;
   oscillator means for providing periodic, time-based signals;
   mode control means selectively coupling said oscillator means and said memory means to said accumulation means whereby in one mode said accumulation means accumulates said extracted signals representative of the activity of said central processor, and in another mode said accumulation means accumulates said time-based signals.

5. Apparatus for measuring the usage of a data processing unit resulting from an execution of a series of instructions comprising:
   memory means for providing a selected group of signals in response to application of a portion of each of said instructions to said memory means;
   means for storing a numerical value;
   adder means coupled to said memory means and responsive to an execution of each of said instructions for changing said numerical value by an amount represented by a particular one of said groups of signals, said particular one group determined by said instruction being executed;
   oscillator means coupled to said means for storing a numerical value, said oscillator means activated when said memory means is not activated, said oscillator means changing said numerical value periodically by a constant amount; and
   analyzing means coupled to said means for storing a numerical value for providing a signal when a predetermined value is reached.

6. Apparatus for measuring the activity of a central processing unit resulting from the execution of a series of instructions, comprising:

memory means for storing groups of signals representing values related to central processing unit activity required for execution of each instruction, said memory means applying a predetermined one of said groups of signals to output terminals in response to application of at least a portion of said related instructions to said memory means;

means coupled to said memory means for accumulating each of said predetermined one group of signals; and analyzing means for determining when the groups of signals in said accumulation means equal pre-established value.

7. The measurement apparatus of claim 6 further including apparatus for generating periodic signals coupled to said accumulating means, said accumulating means selectively accumulating said periodic signals when said group of signals are not applied from said memory means.

8. The measurement apparatus of claim 6 further including a second memory means for storing second groups of signals related to central processing unit activity required for execution of each of a second group of instructions, said second memory means applying a predetermined one of said second group of signals to output terminals in response to application of at least a portion of said related second instructions to said memory means.

9. Apparatus of measuring performance of a central processing unit in the execution of a series of program instructions comprising:

memory means having address associated numeric values representative of individual ones of said program instructions said values being addressable for extraction in response to execution of each of said program instructions;

arithmetic means for storing a total numeric value; and adder means coupled to said memory means and said arithmetic means for changing said total numeric value by said numeric value.

10. The performance measuring apparatus of claim 9 further including analyzing means coupled to said arithmetic means for determining when said total numeric value reaches a predetermined value.

11. The performance measurement apparatus of claim 9 further including second memory means, said second memory means generating a second numeric value in response to execution of each of a selected group of said program instructions.

12. The performance measurement apparatus of claim 8 further including pulse generating means for generating periodic signals, said pulse generating means coupled to said arithmetic means, said arithmetic means incrementing said total numeric value in response to each of said periodic signals.

13. Apparatus for measurement of the activity of a data processing unit required for execution of a sequence of instructions, wherein the activity of a data processing unit in the execution of each instruction is known, comprising:

memory means for storing signals representing values which correspond to known data processing activity for each instruction, said memory means being responsive to execution of each instruction for generating the value signals corresponding to the instruction being executed;

circuit means for storing a resulting group of signals, said circuit means including apparatus responsive to said data processing unit for loading an initial resulting group of signals into said circuit means;

combining means for combining a portion of said resulting group of signals with said value signals; and analyzing circuit coupled to said combining means for determining when said resulting group of signals is a predetermined value.

14. The activity measurement apparatus of claim 13 further including second memory means, said second memory means generating a second group of to value signals for combining with said resulting group of signals.

15. The activity measurement apparatus of claim 13 wherein said circuit means includes a first and a second portion, said first portion containing a portion of said resulting group of signals for combining with said instruction execution activity.

16. Apparatus for measurement of activity of a data processing system to execute a series of instructions including:

circuit means for storing a numerical value;

memory means for storing execution numerical values, said execution numerical values determined by activity of a data processing unit for a related instruction;

combining apparatus responsive to execution of an instruction for changing said numerical value related to instruction being executed to produce a resultant value; and analyzing apparatus coupled to said circuit means for producing a signal when said resultant value is changed by a predetermined amount.

17. The activity measurement apparatus of claim 16 further including clock means coupled to said circuit means for periodically changing said resultant value by a constant amount.

* * * * *